US008516978B2

(12) United States Patent
Horiuchi

(10) Patent No.: US 8,516,978 B2
(45) Date of Patent: Aug. 27, 2013

(54) ANIMAL RESTRAINT SYSTEM

(75) Inventor: Jason Horiuchi, Hewitt, TX (US)

(73) Assignee: Petnovate LLC, Hewitt, TX (US)

( * ) Notice: Subject to any disclaimer, the term of this patent is extended or adjusted under 35 U.S.C. 154(b) by 217 days.

(21) Appl. No.: 13/117,757

(22) Filed: May 27, 2011

(65) Prior Publication Data

US 2011/0297105 A1 Dec. 8, 2011

Related U.S. Application Data

(60) Provisional application No. 61/352,165, filed on Jun. 7, 2010.

(51) Int. Cl.
*A01K 27/00* (2006.01)
(52) U.S. Cl.
USPC .............................. 119/792; 119/856; 119/863
(58) Field of Classification Search
USPC .......................................... 119/792, 856, 863
See application file for complete search history.

(56) References Cited

U.S. PATENT DOCUMENTS

| | | | | | |
|---|---|---|---|---|---|
| 161,461 | A | * | 3/1875 | Walling | 54/71 |
| 626,317 | A | * | 6/1899 | Brown | 54/71 |
| 1,455,341 | A | * | 5/1923 | Kopf | 54/71 |
| 1,685,435 | A | * | 9/1928 | Philbrick | 119/856 |
| 2,534,727 | A | * | 12/1950 | Moyle | 54/71 |
| 2,670,712 | A | * | 3/1954 | Patience et al. | 119/856 |
| 3,769,939 | A | * | 11/1973 | Wais et al. | 119/856 |
| 3,848,571 | A | * | 11/1974 | Pearson et al. | 119/819 |
| 4,389,835 | A | * | 6/1983 | Kavalieros | 54/71 |
| 4,964,369 | A | | 10/1990 | Sporn | |
| 5,325,819 | A | | 7/1994 | Krauss | |
| 5,359,964 | A | | 11/1994 | Sporn | |
| 5,511,515 | A | | 4/1996 | Brown et al. | |
| 6,167,844 | B1 | | 1/2001 | Cantrell et al. | |
| 7,107,939 | B2 | | 9/2006 | Lady | |
| 7,165,511 | B1 | | 1/2007 | Brezinski | |
| 7,353,779 | B2 | * | 4/2008 | Altieri | 119/770 |
| 7,387,087 | B2 | | 6/2008 | Lady | |
| 7,963,255 | B2 | * | 6/2011 | Horgan | 119/792 |
| 2005/0103283 | A1 | * | 5/2005 | Penzak | 119/816 |

* cited by examiner

*Primary Examiner* — Son T Nguyen
*Assistant Examiner* — Kathleen Iwasaki
(74) *Attorney, Agent, or Firm* — Gary L. Bush; Andrews Kurth LLP

(57) ABSTRACT

An animal restraint system including a body harness and a removable control strap assembly. The control strap assembly may include no-pull or no jump/run modules. The body harness includes three adjustable straps that fit over the animal's back, in front of the chest, and underneath and behind the front legs, and two leg straps that encircle the animal's front legs. The no-pull module includes a strap for connecting a leash to the front leg straps. Pulling force is transferred to the animal's front legs, thereby reducing its ability to pull. The no-jump/run module includes hind leg straps that encircle the animal's hind legs and are connected to the corresponding front leg straps by connecting straps. A rear back strap extends across the back of the animal. The design works by limiting the range of motion of the front legs relative to the hind legs to inhibit jumping and running.

15 Claims, 4 Drawing Sheets

ANIMAL RESTRAINT SYSTEM

CROSS REFERENCE TO RELATED APPLICATION

This application is based upon provisional application 61/352,165 filed on Jun. 7, 2010, which is incorporated herein by reference and the priority of which is claimed.

BACKGROUND OF THE INVENTION

1. Field of the Invention

The invention relates generally to an animal restraining system and more particularly to a harness for a dog or like animal.

2. Background Art

It is typical that owners of large or strong animals have dealt with the stress and aggravation of the animal pulling excessively while being walked on a leash. Even worse is that owners of small stature typically have a difficult, if not impossible, task of maintaining control over the animal, which makes walking the animal dangerous and extremely stressful. This excessive pulling or tugging can create pain or discomfort for both the pet owner as well as the animal and can result in permanent muscle or ligament damage.

Prior art harnesses that discourage pulling or tugging behavior include choke collars or prong collars that work by squeezing the neck of the animal when the animal pulls, thereby inflicting discomfort or pain. These devices are viewed as inhumane by many and are ineffective at reducing the pulling force felt at the leash when the animal pulls excessively.

Other prior art harnesses, such as those that have straps that wrap underneath the armpits and over the top of the back of the animal, discourage pulling or tugging by imposing discomfort or pain by squeezing around the back and in the armpits of the animal when the animal pulls excessively. Designs such as these still operate under the principal of applying pain in order to discourage the tugging or pulling behavior. These designs are ineffective at reducing the pulling force felt at the leash when the animal pulls excessively.

Prior art harnesses also include those that are applied to the head of the animal and work by pulling the head back as the animal attempts to pull excessively. These designs are more effective at reducing the pulling force felt at the leash but create problems of extreme discomfort for the animal. They also give the impression to others that the animal is wearing a muzzle and may therefore be dangerous.

Prior art harnesses that have the leash connection in the front or chest of the animal are intended to work by turning the animal sideways when the animal attempts to pull excessively. These designs may be somewhat effective at reducing the pulling force felt at the leash, but they are dependent on proper adjustment and fit on the animal and rely on some training with the animal in order to provide some benefit in force reduction. In addition, the "martingale" collar design actually imposes discomfort in the faint of squeezing to help discourage the animal from pulling or tugging.

Prior art harnesses that target the front legs of the animal work by using the animal's own pulling force against the front legs. This method is effective at consistently reducing the pulling force felt at the leash when the animal pulls. However, these prior art harnesses are complex in design, making fitting and operation difficult. Moreover, part of the harness must be maintained in the correct position across the front of the animal's front legs in order to remain effective.

In addition to pulling, some owners experience problems keeping their animal from jumping onto people or out of yards, or keeping the animal's activity level to a minimum when, for example, the animal is recuperating from an injury. This behavior can present a danger to people who come in contact with the animal, as well as a danger to the animal itself if it has recently undergone surgery and has not fully healed.

Finally, some prior art harnesses connect leg straps around the animal's hind legs and underneath the animal to around the animal's neck. These type of harnesses work by limiting the range of motion of the animal. These designs are suboptimal in that they either do not fully prevent the animal from jumping and are overly-sensitive to proper fitting.

Accordingly, what is needed is a harness that is effective at both reducing the pulling force felt at the leash and preventing the animal from jumping or running, that is not overly dependent on proper fitting or animal training, that does not impose pain or discomfort of the animal, and that is aesthetically pleasing and easy to use.

3. Identification of Objects of the Invention

A primary object of the invention is to provide a harness that is effective in both reducing the pulling force felt at the leash and preventing the animal from jumping.

Another object of the invention is to provide a harness having a modular construction that allows either a no-pull function or a no-jump/run function to be implemented.

Another object of the invention is to provide a harness that reduces the pulling force felt at the leash by transferring pulling force to the front legs of the animal at each leg independently.

Another object of the invention is to provide a harness that is adjustable for fitting animals of different sizes.

Another object of the invention is to provide a harness that imposes no squeezing pressure, choking, or discomfort to the animal to dissuade pulling but operates by a counteracting force directed at the front legs of the animal to prevent the animal from striding or extending its legs forward.

Another object of the invention is to provide a harness that enables an immediate reduction in pulling force felt at the leash without oversensitivity to fitting adjustment and animal training.

Another object of the invention is to provide a harness that provides a comfortable fit to the animal by the use of strap adjusters.

Another object of the invention is to provide a modular animal harness with removable no-pull and no-jump/run modules.

Another object of the invention is to provide a harness that prevents jumping and running of the animal by limiting the range of motion of the animal's front legs in relation to its hind legs.

Another object of the invention is to provide a harness that allows for adjustment of the no jump/run module to the desired range of motion of the animal to balance between preventing the animal from jumping or running and general comfort.

Another object of the invention is to provide a harness that keeps the no-jump/run module in place up and around the hind legs when the animal is sitting by using an elastic back strap.

SUMMARY OF THE INVENTION

The objects described above and other advantages and features of the invention are incorporated in an animal restraint system that, in a preferred embodiment, includes three modular parts: A body harness module, a no-pull module, and a no-jump/run module. The body harness module has three adjustable straps that fit over the animal's back, in front of the chest, and underneath and behind the front legs. The straps are connected together by two connectors. In addition, there are two straps connected to the connectors, one on each side of the animal, which extend toward the animal's front legs and are attached to leg straps with release connectors that connect around the animal's front legs. The no-pull module consists of a single strap attached at each end to the leg straps of the body harness module. The no-pull module includes a connector in the middle to connect a leash.

The design works by transferring the pulling force of the animal felt at the leash through the no-pull module through to the straps of the body harness module that are connected around the animal's front legs. When the animal pulls, force is transferred to the animal's front legs, thereby inhibiting the animal from extending and striding forward, thus reducing its ability to pull. Because there are release connectors on the straps around the animal's front legs, the no-pull module can be removed when the no-pull aspect of the design is not desired and the no-jump/run module can be connected in its place.

The no-jump/run module consists of five adjustable straps: Two hind leg straps with release connectors, two leg connecting straps, and a rear back strap. The hind leg straps are each connected to a connector that also connects a leg connecting strap that extends toward the front legs of the animal. At the forward end of each leg connecting strap is a connector for connecting to the corresponding front leg strap of the body harness module. The rear back strap is connected to each connector and extends across the rear back of the animal to support the no-jump/run module.

The no-jump/run design works by limiting the range of motion of the front legs of the animal relative to its hind legs. The proper adjustment of the leg connecting straps that connect the front legs to the hind legs ensures that the animal cannot stand on its hind legs when attempting to jump or stride to prevent the animal from jumping and running.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

According to a preferred embodiment, an animal harness includes a body harness module 100 and a disconnectable control strap assembly. The control strap assembly may include a no-pull module 200 or a no-jump/run module 300, depending on the needs of the user.

Figure 1:
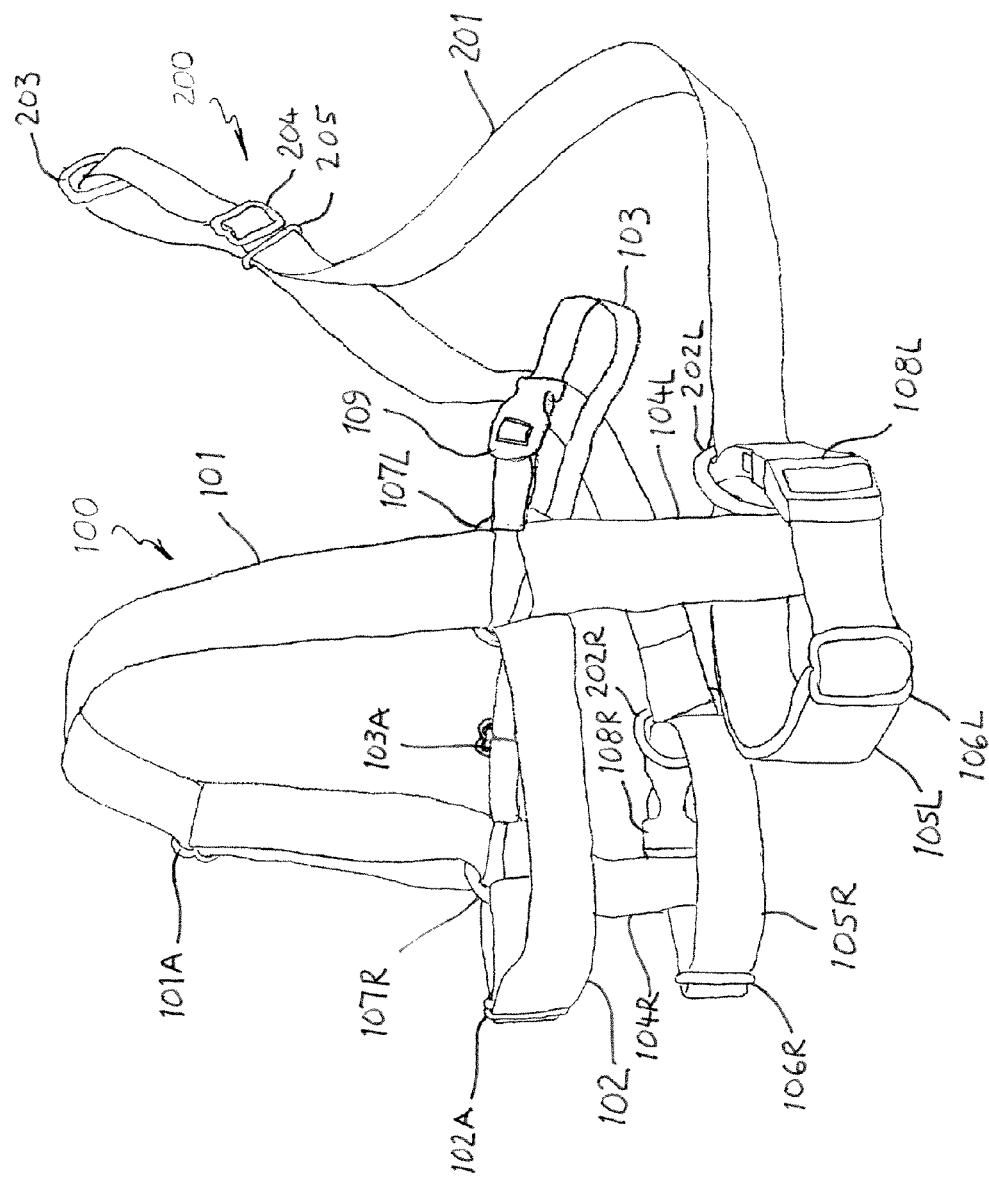
FIG. 1 is a perspective view of the animal harness arrangement according to a preferred embodiment of the invention, showing a body harness module and a disconnectable no-pull module.
Figure 2:
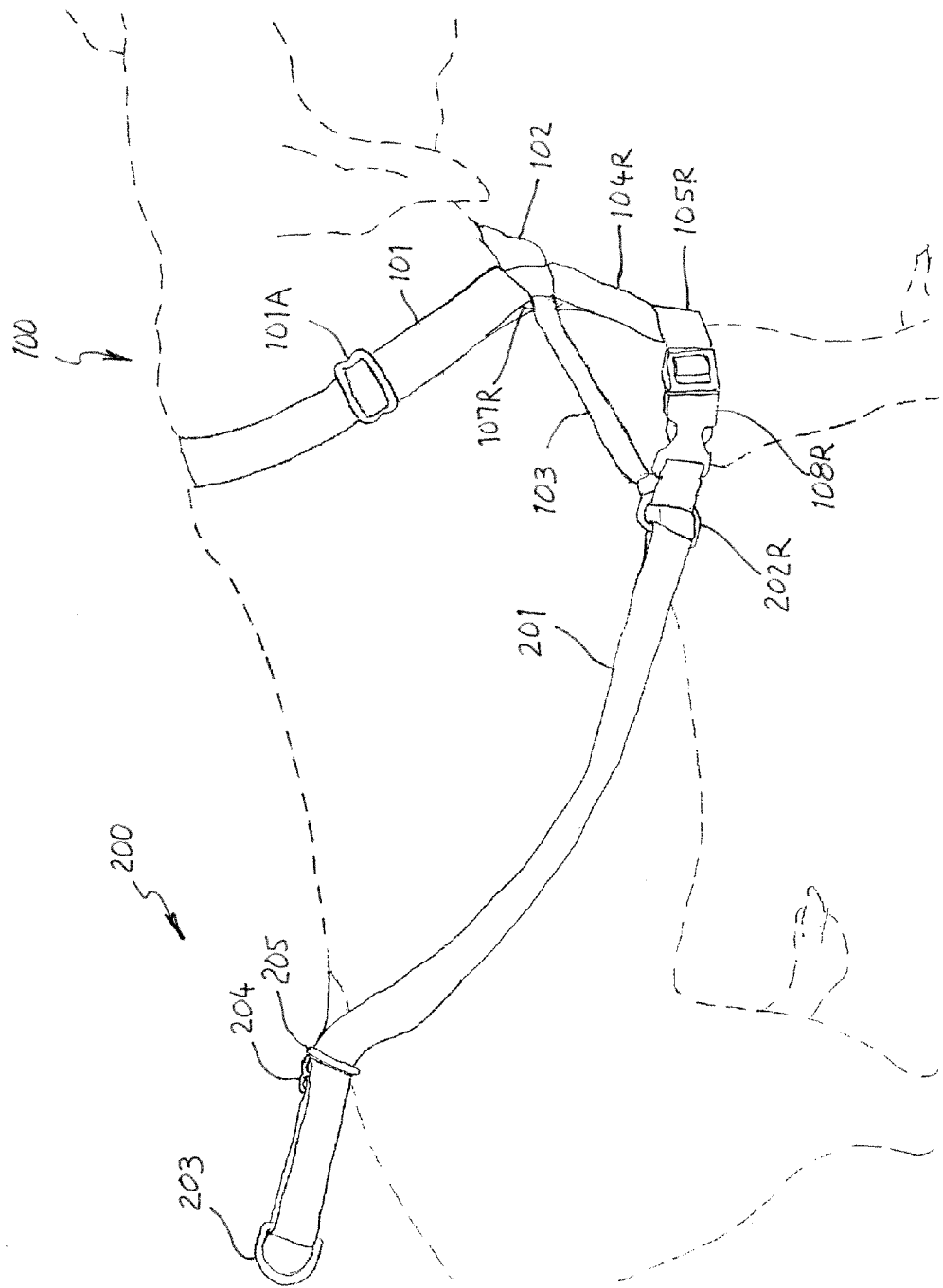
FIG. 2 is a perspective view of the animal harness arrangement of FIG. 1 shown secured in place about an animal.

FIGS. 1 and 2 illustrate an animal body harness module 100 and a no-pull module 200 in accordance with a preferred embodiment of the invention. Body harness module 100 and no-pull module 200 are most suitable for dogs, but they may be used for any other four-legged animal. The body harness module 100 includes a chest strap 102, a back strap 101, left and right front leg straps 105L and 105R, left and right connecting straps 104L and 104R for the front leg straps, and a girth strap 103, all of which may be flexible and may include elastic or stretchable portions and which may be formed from leather, woven or unwoven material or other appropriate materials. All straps are preferably made of webbing except girth strap 103, which is preferably made of elastic.

Front leg straps 105L and 105R form loops in order to receive the front legs of the animal. The front leg straps 105L and 105R are preferably adjustable using strap adjusters 106L and 106R in order to adjust the length of the straps to create an appropriate fit around the animal's front legs for accommodating animals of varying size. A lower end of left connecting strap 104L may be connected to the left front leg strap 105L, preferably by sewing, although it may be attached by other methods. The upper end of left connecting strap 104L is connected to a connector 107L so that strap 104L is substantially vertical when the harness is worn on the animal. An opposing right connecting strap 104R is connected to the front leg strap 105R and an opposing right connector 107R in the same manner. Connecting straps 104L, 104R may also include length adjusting devices (not illustrated) as appropriate, to fit animals of varying size.

Chest strap 102 is connected between connector 107L and opposing 107R. The length of chest strap 102 may be adjusted to be shorter or longer by using a strap adjuster 102A. Additionally, back strap 101, is connected between connectors 107L and 107R and extends across a forward region of the back of the animal in order to provide support to the body harness module 100. The back strap 101 is preferably adjustable in length by using strap adjuster 101A. Additionally, girth strap 103 may be connected between connectors 107L and 107R so as to extend across the underside of the animal behind the front legs in order to maintain body harness module 100 in position. The girth strap 103 is also preferably adjustable in length by using strap adjuster 103A. Connectors 107L and 107R are preferably O-shaped rings to allow back strap 101, chest strap 102, and girth strap 103 to pivot and adjust over the designed length. Alternatively, strap adjusters 106R, 106L, 101A, 102A, and 103A may be eliminated and straps 101, 102, 103, 105L and 105R may be sized to fit an animal of a predetermined size.

No-pull module 200 includes a flexible control strap 201. Control strap 201 is preferably made of webbing and may include elastic or stretchable portion. Strap 201 may be formed from leather, woven or unwoven material or other appropriate materials. Control strap 201 is connected to connector ring 202L on one end and connected to connector 202R on the other end. Approximately in the middle of the length of control strap 201 is a connector 203, preferably a D-ring, which may connect to a leash (not shown) and is maintained in position by loops 204 and 205. Loops 204 and 205 may slide along control strap 201, which serves as a way to hold opposing sides of control strap 201 together and as a means of adjusting control strap 201 so that it can lie or rest on the back of the animal without being able to slip behind the rear of the animal and fall to the floor. The harness design allows for connector 203 to slide along control strap 201 to allow the owner total control when the animal pulls to either side. However, loops 204, 205 may be replaced with other suitable devices or arrangements as appropriate.

Front leg straps 105R and 105L and girth strap 103 may include releasable connectors 108R, 108L, and 109, respectively, that allow the body harness module 100 to be easily applied to the animal as well as allow for the addition or removal of no-pull module 200. Releasable connectors 108L, 108R and 109 are disconnected for enabling body harness module 100 to be placed on the animal. The animal's head is placed between back strap 101 and chest strap 102. Both back strap 101 and chest strap 102 are adjusted until connectors 107L and 107R are located vertically in line with the animal's front legs with enough distance to be able to connect release connectors 108L and 108R on front leg straps 105L and 105R. Girth strap 103 is then adjusted using strap adjuster 103A to fit appropriately underneath and behind the front legs of the animal and then reconnected using release connector 109.

With release connectors 108L and 108R disconnected, no-pull module 200 can be connected to body harness module 100 by threading front leg straps 105L and 105R through connectors 202L and 202R, respectively, and then reconnecting release connectors 108L and 108R to close front leg straps 105L and 105R. However, other methods for connecting strap 201 to leg straps 105L, 105R may be used as appropriate.

Figure 3:
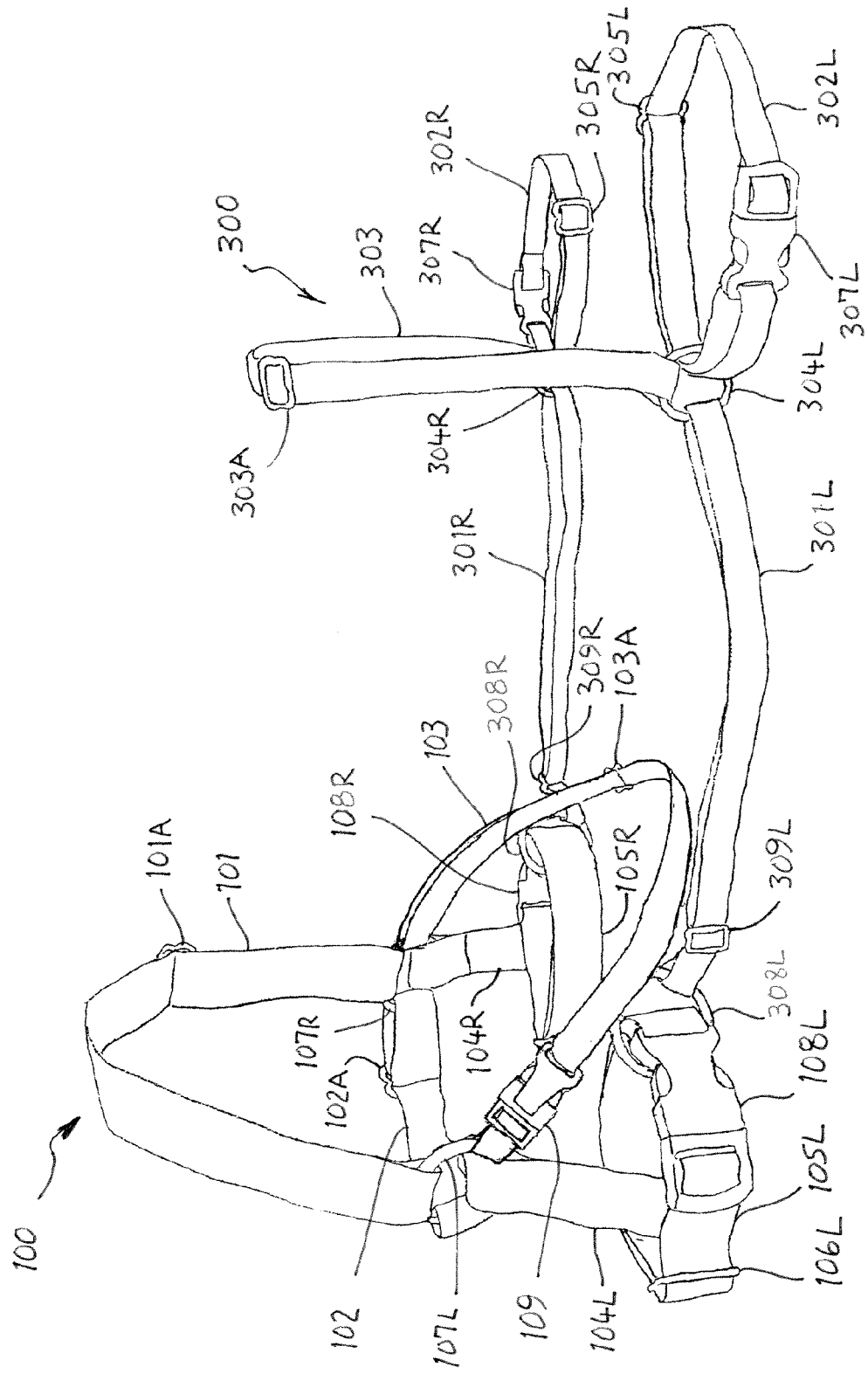
FIG. 3 is a perspective view of the animal harness arrangement of FIG. 1, shown with the body harness module and a no-jump/run module connected in place of the no-pull module.
Figure 4:
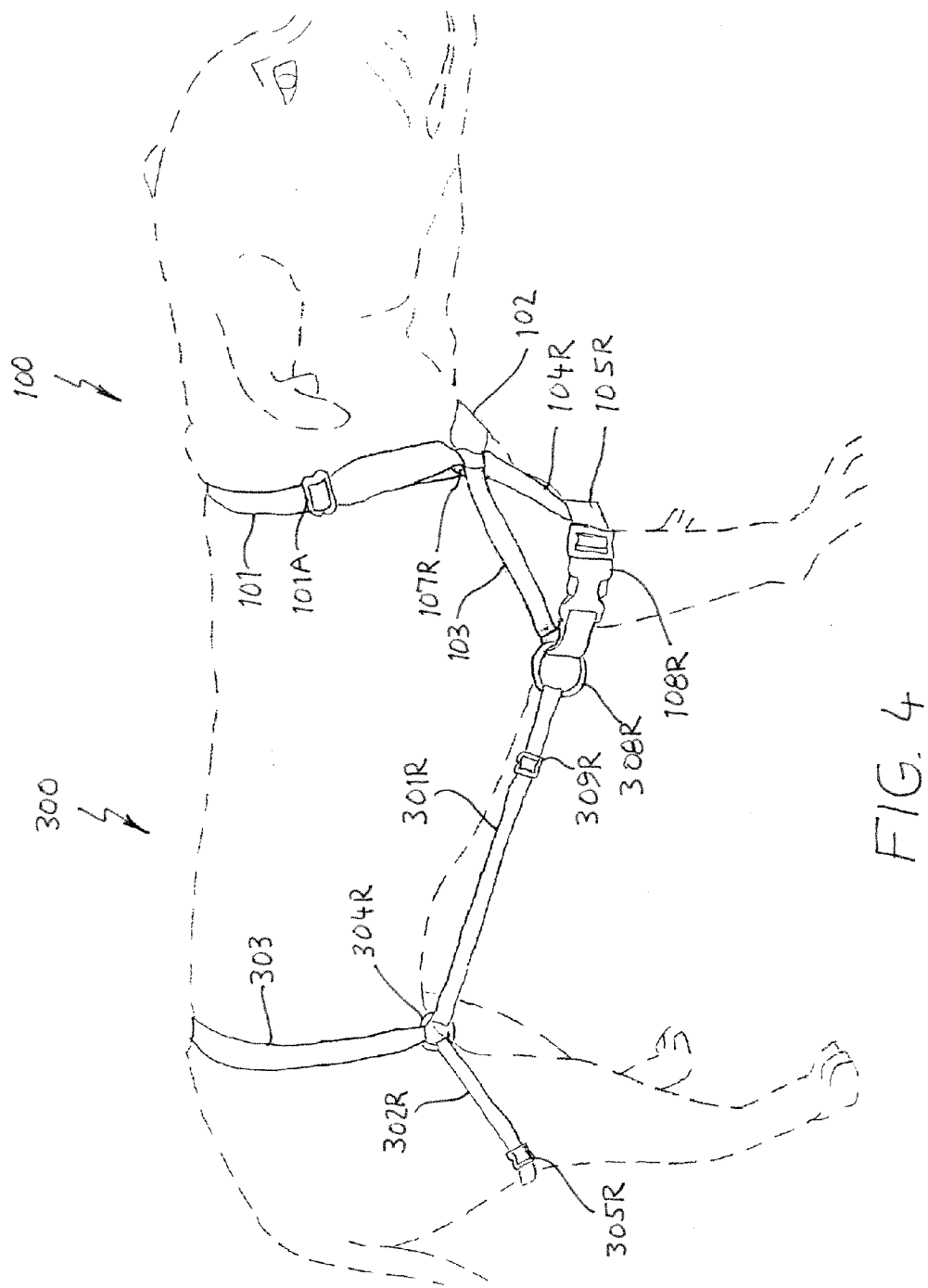
FIG. 4 is a perspective view of the animal harness arrangement of FIG. 3 shown secured in place about an animal.

FIGS. 3 and 4 illustrate animal body harness 100 with a no-jump/run module 300 connected thereto according to a preferred embodiment of the invention. Body harness module 100 and no-jump/run module 300 are most suitable for dogs, but they can be used for any other four-legged animal. The body harness module 100 is described above with respect to FIGS. 1 and 2. No-jump/run module 300 includes left and right leg connecting straps 301L and 301R, left and right hind leg straps 302L and 302R, and rear back strap 303, all of which are flexible and may include elastic or stretchable portions and which may be formed from leather, woven or unwoven material or other appropriate materials. All straps are preferably made of webbing except rear back strap 303, which is made preferably of elastic. Hind leg straps 302L and 302R form loops in order to receive the hind legs of the animal. Left hind leg strap 302L is connected to left leg connecting strap 301L by a connector 304L, and right hind leg strap 302R is likewise connected to a right leg connecting strap 301R by a right connector 304R. However, hind leg straps 302R, 302L may be connected to leg connecting straps 301R, 301L by other means, such as by sewing, for example. Back strap 303 connects between connectors 304L and 304R and extends across a rear region of the back of the animal in order to provide support to the no-jump/run module 300. Connectors 304L and 304R are preferably O-shaped rings that allow leg connecting straps 301L, 301R, hind leg straps 302L, 302R, and back strap 303 to pivot and adjust over the designed lengths.

The hind leg straps 302L and 302R are preferably adjustable using strap adjusters 305L and 305R, respectively, in order to adjust the diameter of the loops so as to create an appropriate fit about the animal's legs. Similarly, connecting straps 301L and 301R may include adjusters 309L, and 309R, respectively, for sizing the harness to accommodate animals of varying sizes by adjusting distance between front and hind legs so as to limit the animal's movement but not to create discomfort. Back strap 303 may be adjustable in length by using a strap adjuster 303A to create sufficient tension to allow hind leg straps 302L and 302R to maintain a high position up on the animal's hind legs when the animal is sitting. Alternatively, strap adjusters 305L, 305R, 309L, 309R, and 303A may be eliminated and straps 301L, 301R, 302L, 302R, and 303 may be sized to fit an animal of a predetermined size.

Hind leg straps 302L and 302R preferably include releasable connectors 307L and 307R that allow the no-jump/run module 300 to be easily applied to the hind legs of the animal. No-jump/run module 300 is connected to or disconnected from body harness module 100 in the same manner as described above with respect to the no-pull module 200. With release connectors 108L and 108R on front leg straps 105L and 105R disconnected, no-jump/run module 300 is connected by threading front leg straps 105L and 105R through each connector 308L and 308R on leg connecting straps 301L and 301R and then reconnecting release connectors 108L and 108R to close front leg straps 105L and 105R. However, other connection arrangement may be used as appropriate.

Although the above description is specific, it should not be considered as limiting the scope of the invention, but only as an example of the preferred embodiments. For example, the release buckles and O-shaped connector rings may be replaced with a number of different fasteners including spring clips and hook-and-loop systems. The straps can be of different material types and different sizes and include strap adjusters made of either plastic or metal and be of different designs.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A harness for restraining an animal comprising:
   left and right fore leg straps (105L, 105R) dimensioned to be secured about the fore legs of said animal;
   a forward back strap (101) coupled between said left and right fore leg straps and dimensioned to be secured across the back and behind the neck of said animal;
   a chest strap (102) coupled between left and right sides of said forward back strap at a left connector (107L) and a right connector (107R) and dimensioned to be secured across the chest of said animal;
   a control strap assembly (200, 300) coupled to said left and right fore leg straps; and
   a girth strap (103) coupled between said left and right sides of said forward back strap at said left connector (107L) and said right connector (107R) and dimensioned to be secured across the underside behind said fore legs of said animal.

2. The harness of claim 1 wherein:
   at least one of said left fore leg strap (105L), said right fore leg strap (105R), and said girth strap (103) includes a releasable connector.

3. The harness of claim 1 further comprising:
   a left forward connecting strap (104L) connected between said left fore leg strap (105L) and said back strap (101) at said left connector (107L); and
   a right forward connecting strap (104R) connected between said right fore leg strap (105R) and said back strap (101) at said right connector (107R).

4. The harness of claim 1 further comprising:
   a length adjustment device (109) operable to adjust the length of said girth strap (103).

5. The harness of claim 1, wherein said control strap assembly (200) includes:
   a no-pull strap (201) having a first end connected to said left fore leg strap (105L) and a second end connected to said right fore leg strap (105R), said no-pull strap being dimensioned to be positioned over the back, behind the neck and forward of the rear, of said animal; and a connector (203) connected at a mid-portion of said no-pull strap and arranged for removable coupling to a leash.

6. The harness of claim 1 wherein said control strap assembly (300) includes:
   a left connector strap (301L) connected between said left fore leg strap (105L) and a left hind leg strap (302L), said left hind leg strap being dimensioned to be secured about the left hind leg of said animal;
   a right connector strap (301R) connected between said right fore leg strap (105R) and a right hind leg strap (302R), said right hind leg strap being dimensioned to be secured about the right hind leg of said animal; and
   a rear back strap (303) connected between said left and right hind leg straps and dimensioned to be secured across the back of said animal.

7. The harness of claim 1 wherein:
   at least one of said left fore leg strap (105L), said right fore leg strap (105R), chest strap (102), and said forward back strap (101) includes a length adjustment device.

8. The harness of claim 1 wherein:
   said chest strap (102) is connected to said forward back strap (101) at an elevation above said left and right fore leg straps (105L, 105R) when said harness is worn by said animal.

9. The harness of claim 1 wherein:
   said control strap assembly (200, 300) is releasably coupled to said left and right fore leg straps (105L, 105R).

10. A harness kit comprising:
    a body harness module (100);
    a no-pull harness module (200) releasably connectable to said body harness module; and
    a no-jump/run harness module (300) releasably connectable to said body harness module;
    said body harness module (100) including left and right fore leg loop straps (105L, 105R) dimensioned to be secured about left and right fore legs of an animal, a forward back strap (101) connected between said left and right fore leg loop straps dimensioned to be secured across the back of said animal, and a chest strap (102) coupled between left and right sides of said forward back strap at a left connector (107L) and a right connector (107R) and dimensioned to be secured across the chest of said animal; and
    a girth strap (103) coupled between said left and right sides of said forward back strap at said left connector (107L) and said right connector (107R) and dimensioned to be secured across the underside behind said left and right fore legs of said animal.

11. The harness kit of claim 10 wherein said no-pull harness module (200) comprises:
    a control strap (201) arranged to be removably connected between said left and right fore leg loop straps (105L, 105R) and dimensioned to be disposed across the back of said animal rearward of said back strap (101); and
    a leash connector (203) connected to said control strap.

12. The harness kit of claim 10 wherein said no-jump/run harness module (300) comprises:
    left and right hind leg loop straps (302L, 302R) dimensioned to be secured about left and right hind legs of said animal and arranged to be removably connected to said left and right fore leg loop straps (105L, 105R), respectively, via left and right connecting straps (301L, 301R); and
    a rear back strap (303) coupled between said left and right hind leg loop straps (302L, 302R) and dimensioned to be secured across the back of said animal.

13. The harness kit of claim 10 wherein:
    said body harness module (100), said no-pull harness module (200), and said no-jump/run harness module (300) are selectively adjustable so as to accommodate animals of varying size.

14. A harness for restraining an animal comprising:
    a body harness module including:
    left and right fore leg straps (105L, 105R) dimensioned to be secured about the fore legs of said animal,
    a formal back strap (101) coupled between said left and right fore leg straps and dimensioned to be secured across the back behind the neck of said animal,
    a chest strap (102) coupled between left and right sides of said forward back strap at a left connector (107L) and a right connector (107R) and dimensioned to be secured across the chest of said animal, and
    a girth strap (103) coupled between said left and right sides of said forward back strap at said left connector (107L) and said right connector (107R) and dimensioned to be secured across the underside behind said left and right fore legs of said animal; and
    a control strap assembly removably coupled to said left and right fore leg straps, said control strap assembly including one from the group consisting of a no-pull module (200) and a no-jump/run module (300); wherein
    said no-pull harness module (200) includes a control strap (201) arranged to be removably connected between said left and right fore leg loop straps (105L, 105R) and dimensioned to be disposed across the back of said animal rearward of said back strap (101), and a leash connector (203) connected to said control strap; and wherein
    said no-jump/run harness module (300) includes left and right hind leg loop straps (302L, 302R) dimensioned to be secured about left and right hind legs of said animal and arranged to be removably connected to said left and right fore leg loop straps (105L, 105R), respectively, via left and right connecting straps (301L, 301R), and a rear back strap (303) coupled between said left and right hind leg loop straps (302L, 302R) and dimensioned to be secured across the back of said animal.

15. The harness of claim 14 wherein:
    said body harness module (100) and said control strap assembly are selectively adjustable so as to accommodate animals of varying size.

* * * * *